United States Patent
Shimizu et al.

(10) Patent No.: US 9,862,025 B2
(45) Date of Patent: Jan. 9, 2018

(54) METHOD FOR REPAIRING DIE-CASTING SLEEVE AND REPAIRED DIE-CASTING SLEEVE

(71) Applicant: HITACHI METALS, LTD., Minato-ku, Tokyo (JP)

(72) Inventors: Kenichiro Shimizu, Kitakyushu (JP); Norio Kumagai, Kitakyushu (JP); Hidefumi Hisanabe, Kitakyushu (JP)

(73) Assignee: HITACHI METALS, LTD., Tokyo (JP)

( * ) Notice: Subject to any disclaimer, the term of this patent is extended or adjusted under 35 U.S.C. 154(b) by 635 days.

(21) Appl. No.: 14/363,988

(22) PCT Filed: Nov. 8, 2013

(86) PCT No.: PCT/JP2013/080255
§ 371 (c)(1),
(2) Date: Jun. 9, 2014

(87) PCT Pub. No.: WO2015/001687
PCT Pub. Date: Jan. 8, 2015

(65) Prior Publication Data
US 2015/0266088 A1 Sep. 24, 2015

(30) Foreign Application Priority Data
Jul. 5, 2013 (JP) ................. 2013-141545

(51) Int. Cl.
*B23P 6/00* (2006.01)
*B22D 17/20* (2006.01)
*B22D 21/00* (2006.01)

(52) U.S. Cl.
CPC ....... *B22D 17/2023* (2013.01); *B22D 21/007* (2013.01); *B23P 6/00* (2013.01); *Y10T 29/4973* (2015.01)

(58) Field of Classification Search
CPC ....... B22D 17/2023; B22D 1/007; B23P 6/00; Y10T 29/4973; B23B 31/1179
See application file for complete search history.

(56) References Cited

U.S. PATENT DOCUMENTS

| | | | | |
|---|---|---|---|---|
| 5,148,780 A | * | 9/1992 | Urano | ........ F02F 1/12 123/193.2 |
| 5,322,111 A | * | 6/1994 | Hansma | ......... B22D 17/2023 164/312 |
| 2012/0131790 A1 | * | 5/2012 | Schacherer | ....... B23B 31/1179 29/557 |

FOREIGN PATENT DOCUMENTS

| | | |
|---|---|---|
| JP | 04-105761 A | 4/1992 |
| JP | 07-246449 A | 9/1995 |

(Continued)

OTHER PUBLICATIONS

JP 09 108811 Machine Translation.*

(Continued)

*Primary Examiner* — Jacob Cigna
*Assistant Examiner* — Lee A Holly
(74) *Attorney, Agent, or Firm* — Sughrue Mion, PLLC

(57) ABSTRACT

A method for repairing a die-casting sleeve comprising a ceramic-made inner cylinder shrink-fit in a metal-made outer cylinder, comprising the steps of detaching the used inner cylinder from the outer cylinder by heating; forming a diameter-increasing layer on a peripheral surface of the outer cylinder before or after shrink-fitting a new inner cylinder in the outer cylinder; assembling a new inner cylinder in the outer cylinder; and then machining the diameter-increasing layer to a cylindrical shape.

12 Claims, 9 Drawing Sheets

(56) References Cited

FOREIGN PATENT DOCUMENTS

| | | | |
|---|---|---|---|
| JP | 09-108811 A | | 4/1997 |
| JP | 09108811 A | * | 4/1997 |
| JP | 09-323145 A | | 12/1997 |
| JP | 2000-288839 A | | 10/2000 |
| JP | 2000288839 A | * | 10/2000 |
| JP | 2002-192320 A | | 7/2002 |
| JP | 2005-305451 A | | 11/2005 |

OTHER PUBLICATIONS

JP 2000 288839 Machine Translation.*
International Search Report of PCT/JP2013/080255 dated Dec. 3, 2013.

* cited by examiner ns sandwiching a circular shape when they have the minimum gap (JIS B 0621)] than that before detaching, so that the assembling of such a sleeve in a die-casting machine leaves a slight gap between a holding member of the die-casting machine and a peripheral surface of the outer cylinder of the sleeve, resulting in the vibration of the sleeve. The cause of increasing deviation from a perfect circle is not necessarily clear, but it may be presumed that because individual inner cylinders shrink-fit in the outer cylinder do not have the same peripheral surface precision, the outer cylinder receives different distributions of stress from new inner cylinders, so that the outer cylinder is deformed.

METHOD FOR REPAIRING DIE-CASTING SLEEVE AND REPAIRED DIE-CASTING SLEEVE

CROSS REFERENCE TO RELATED APPLICATIONS

This is a National Stage of International Application No. PCT/JP2013/080255 filed Nov. 8, 2013 (claiming priority based on Japanese Patent Application No. 2013-141545 filed Jul. 5, 2013), the contents of which are incorporated herein by reference in their entirety.

FIELD OF THE INVENTION

The present invention relates to a method for repairing a die-casting sleeve for injecting a melt of a non-ferrous metal such as an aluminum alloy, etc. into a die-casting die, and a repaired die-casting sleeve.

BACKGROUND OF THE INVENTION

In a die-casting machine, a molten metal (melt) is supplied to a sleeve, injected by a plunger tip sliding in the sleeve into a die cavity communicating with the sleeve, and solidified by cooling to form die castings. Accordingly, an inner surface of the sleeve is melted by the melt, and worn by the sliding plunger tip. With the inner surface of the sleeve damaged by melting and wearing, a melt intrudes into gaps between the sleeve and the plunger tip, increasing the sliding resistance of the sleeve, lowering an injection speed, and deteriorating product quality. When a large amount of a lubricant is used to reduce sliding resistance and to prevent seizure between the sleeve and the plunger tip, impurities such as a gas, etc. are likely introduced into the melt, resulting in deteriorated product quality.

To reduce the melting and wearing of an inner surface of a sleeve, a die-casting sleeve having a composite structure comprising a ceramic-made inner cylinder shrink-fit in a metal-made outer cylinder has conventionally been proposed. For example, JP 7-246449 A discloses a die-casting sleeve comprising an outer cylinder made of a high-strength, low-thermal-expansion metal such as an Fe—Ni—Co alloy, and an inner cylinder made of a ceramic such as silicon nitride, Sialon, etc., which is shrink-fit in the outer cylinder, the high-strength, low-thermal-expansion metal having an average thermal expansion coefficient of $1 \times 10^{-6}/°$ C. to $5 \times 10^{-6}/°$ C. at 20-300° C. and $5 \times 10^{-6}/°$ C. or more at 20-600° C. Such a die-casting sleeve structure provides strong shrink fitting between the outer cylinder and the inner cylinder, resulting in excellent injection stability (melting resistance, wear resistance, heat resistance, melt temperature retention and seizure resistance) and thus stabilized product quality. Also, because the amount of a lubricant can be reduced to about ¼ of a conventional level by the ceramic-made inner cylinder, the generation of gaseous smoke is suppressed, and the sleeve and the plunger tip are provided with a longer life.

JP 9-108811 A discloses a die-casting sleeve comprising an inner cylinder made of ceramics such as silicon nitride, Sialon, etc., which is shrink-fit in an outer cylinder made of an Fe—Ni—Co alloy, to which one or more precipitation-strengthening elements are added, a friction-reducing material such as a fluororesin, graphite or molybdenum disulfide being sandwiched by the outer cylinder and the inner cylinder. The friction-reducing material reduces residual stress in the shrink-fit outer and inner cylinders, preventing the breakage of a tip end portion of the inner cylinder while the sleeve is used, thereby providing the inner cylinder with a long life.

JP 2002-192320 A discloses a die-casting sleeve comprising an inner cylinder fit in an outer cylinder made of hot-die steel such as SKD61, the inner cylinder coming into contact with a molten metal being constituted by a front member on the injection outlet side and a rear member on the rear side of the front member, the front member being made of a high-strength, low-thermal-expansion metal such as an Fe—Ni alloy or its composite material with silicon nitride ceramic particles, and the rear member being made of Sialon.

Any of the above conventional die-casting sleeves has excellent melting resistance, wear resistance, heat resistance and seizure resistance, thereby achieving a long life, because all or part of the inner cylinder is made of ceramics. Nevertheless, the inner cylinders are worn with time, so that they are discarded after use for a predetermined period of time.

To reuse an outer cylinder after the used inner cylinder is detached by heating, the inventors have investigated the shrink-fitting of a new inner cylinder thereto. It has been found, however, that when molding is conducted with such a repaired die-casting sleeve, the sleeve is vibrated as a plunger moves, so that a melt surface is waved in the sleeve, resulting in molding defects.

As a result of intensive research on the causes of defective molding, it has been found that when a new inner cylinder is shrink-fit after the used inner cylinder is detached by heating, a peripheral surface of the outer cylinder has slightly larger deviation from a perfect circle [deviation from roundness, expressed by radius difference of two concentric circles sandwiching a circular shape when they have the minimum gap (JIS B 0621)] than that before detaching, so that the assembling of such a sleeve in a die-casting machine leaves a slight gap between a holding member of the die-casting machine and a peripheral surface of the outer cylinder of the sleeve, resulting in the vibration of the sleeve. The cause of increasing deviation from a perfect circle is not necessarily clear, but it may be presumed that because individual inner cylinders shrink-fit in the outer cylinder do not have the same peripheral surface precision, the outer cylinder receives different distributions of stress from new inner cylinders, so that the outer cylinder is deformed.

OBJECT OF THE INVENTION

Accordingly, an object of the present invention is to provide a method for repairing a die-casting sleeve comprising a ceramic-made inner cylinder shrink-fit in a metal-made outer cylinder, with sufficiently small deviation from a perfect circle on a peripheral surface of the outer cylinder, and a die-casting sleeve repaired by such a method.

DISCLOSURE OF THE INVENTION

As a result of intensive research on a method of preventing the peripheral surface of the metal-made outer cylinder from having large deviation from a perfect circle, when the ceramic-made inner cylinder is exchanged to repair the above shrink-fitting-type die-casting sleeve, the inventors have found that what is needed to remove deformation generated by the exchange of the inner cylinder from the peripheral surface of the outer cylinder in the shrink-fitting-type die-casting sleeve is to form a diameter-increasing layer on the peripheral surface of the outer cylinder by a plating method, a thermal spraying method, a build-up welding method, etc. before or after shrink-fitting a new inner cylinder, and then grind the diameter-increasing layer to a cylindrical shape. The present invention has been completed based on such finding.

Thus, the method of the present invention for repairing a die-casting sleeve comprising a ceramic-made inner cylinder shrink-fit in a metal-made outer cylinder comprises the steps of detaching the used inner cylinder from the outer cylinder by heating; forming a diameter-increasing layer on a peripheral surface of the outer cylinder, before or after shrink-fitting a new inner cylinder in the outer cylinder; assembling the new inner cylinder in the outer cylinder; and then machining the diameter-increasing layer to a cylindrical shape.

The diameter-increasing layer is preferably a plating layer, a thermally sprayed layer or a build-up welded layer. The diameter-increasing layer is more preferably a plating layer of a hard metal. The plating layer is preferably a Cr plating layer or a Ni plating layer.

When a Cr or Ni plating layer remains on a peripheral surface of the outer cylinder after the used inner cylinder is detached by heating, a new Cr or Ni plating layer is preferably formed after removing the Cr or Ni plating layer. The Cr or Ni plating layer before removed is one formed in the previous repairing step.

When the diameter-increasing layer is a plating layer of a hard metal, the plating layer is preferably formed on a peripheral surface of the outer cylinder after the new inner cylinder is shrink-fit.

When the diameter-increasing layer is a thermally sprayed layer or a build-up welded layer, the thermally sprayed layer or build-up welded layer is preferably formed on a peripheral surface of the outer cylinder before the new inner cylinder is shrink-fit.

In the case of repair after second one, a new diameter-increasing layer is preferably formed after removing the used diameter-increasing layer.

The metal forming the outer cylinder is preferably a high-strength, low-thermal-expansion metal having an average thermal expansion coefficient of $1 \times 10^{-6}/°$ C. to $5 \times 10^{-6}/°$ C. between 20° C. and 300° C., and $5 \times 10^{-6}/°$ C. or more between 20° C. and 600° C.

The metal forming the outer cylinder preferably has tensile strength of 590 MPa or more at a temperature of 20-500° C.

The metal forming the outer cylinder is preferably an Fe—Ni—Co alloy, to which one or more precipitation-strengthening elements are added.

The ceramic forming the inner cylinder is preferably a silicon nitride-based sintered body, more preferably silicon nitride or Sialon.

The die-casting sleeve of the present invention repaired by the above method has a plating layer, a thermally sprayed layer or a build-up welded layer remaining on a peripheral surface of the outer cylinder.

DESCRIPTION OF THE PREFERRED EMBODIMENTS

The embodiments of the present invention will be explained in detail below referring to the attached drawings, of course without intention of restricting the present invention thereto. Explanations of each embodiment are applicable to other embodiments unless otherwise mentioned.

[1] Die-casting Sleeve (A) First Example (a) Structure of Sleeve

Figure 1:
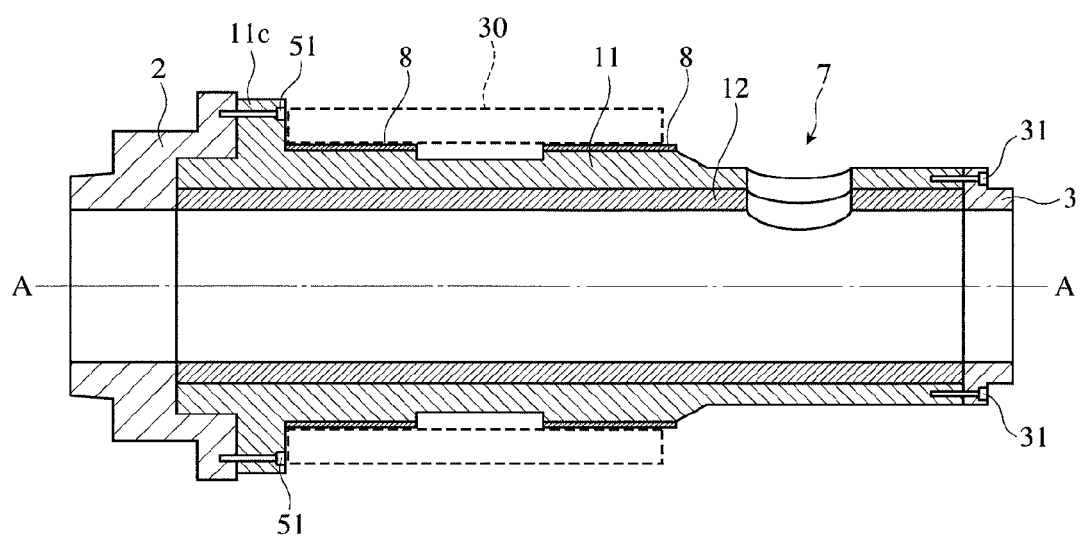
FIG. 1 is a cross-sectional view showing the first example of die-casting sleeves, on which the repairing method of the present invention can be used.
Figure 2:
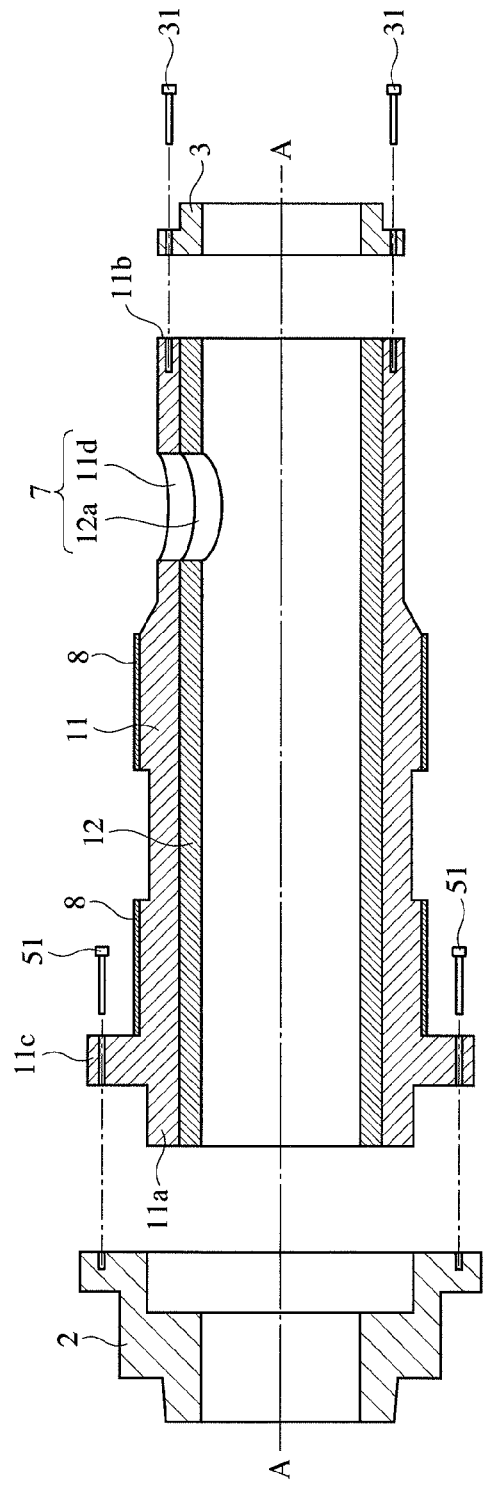
FIG. 2 is an exploded cross-sectional view showing the die-casting sleeve of FIG. 1.
Figure 3:
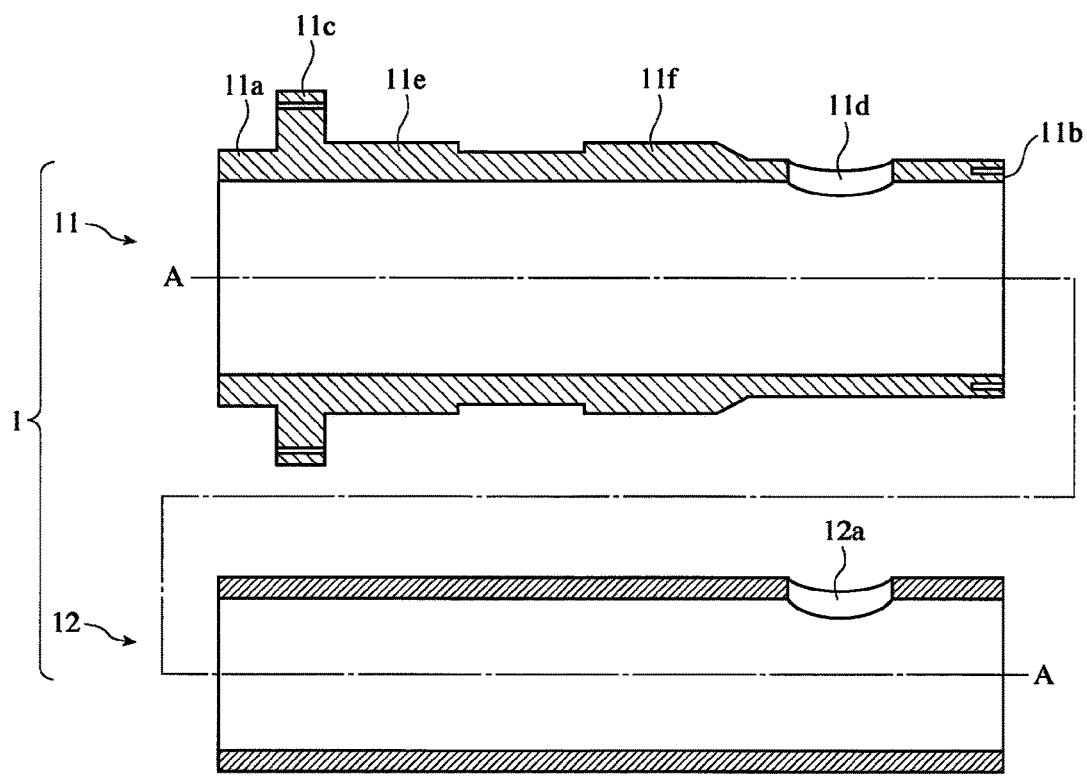
FIG. 3 is an exploded cross-sectional view showing an outer cylinder and an inner cylinder constituting the die-casting sleeve of FIG. 1.

FIGS. 1-3 show the first example of die-casting sleeves repaired by the method of the present invention. In FIG. 1, a straight line A-A indicates a center axis of the repaired sleeve 1. The same is true below. This die-casting sleeve 1 comprises an outer cylinder 11, and an inner cylinder 12 shrink-fit in the outer cylinder 11. The outer cylinder 11 has a tip end portion 11a shrink-fit in a front ring member 2 to be fixed to a die-casting machine, and a rear end surface 11b to which a rear ring member 3 is fixed by bolts 31. A peripheral surface of the outer cylinder 11 is provided with an annular flange 11c adjacent to the tip end portion 11a, and the front ring member 2 is fixed to the annular flange 11c by bolts 51, 51 to prevent deviation from the tip end portion 11a of the outer cylinder 11.

The outer cylinder 11 has an opening 11d near the rear end surface 11b, and the inner cylinder 12 has an opening 12a aligned with the opening 11d of the outer cylinder 11. Both communicating openings 11d, 12a constitute a melt-supplying opening 7. The outer cylinder 11 may have, for example, an inner diameter of 90-180 mm, an outer diameter of 150-300 mm, and a longitudinal length of 600-1300 mm.

The peripheral surface of the outer cylinder 11 is provided with two circular holding surfaces 11e, 11f between the annular flange 11c and the opening 11d. Because the circular holding surfaces 11e, 11f are machined to cylindrical shapes at every repair, they preferably have larger outer diameters than those of other portions of the peripheral surface of outer cylinder 11. Specifically, the circular holding surfaces 11e, 11f are preferably higher by about 0.5-6 mm than other portions of the peripheral surface of the outer cylinder 11. Though the number of the circular holding surfaces 11e, 11f are two in this example, it is of course not restrictive but may be one or three or more. Two circular holding surfaces 11e, 11f can act to fix the sleeve 1 to the die-casting machine most stably. The machining of the circular holding surfaces 11e, 11f to cylindrical shapes can be conducted by cutting, grinding or polishing.

(b) Diameter-increasing Layer

The repaired sleeve 1 has diameter-increasing layers 8, 8 each formed on each circular holding surface 11e, 11f of the outer cylinder 11. The diameter-increasing layers 8, 8 are formed on the circular holding surfaces 11e, 11f, to absorb deformation generated on the peripheral surface of the outer cylinder 11 by detaching the used inner cylinder 12 by heating and shrink-fitting a new inner cylinder 12. From the aspect of a coating speed, the diameter-increasing layers 8, 8 are preferably plating layers, thermally sprayed layers or build-up welded layers, though not restrictive. Each formed diameter-increasing layer 8, 8 is machined to a cylindrical shape.

In any case where each diameter-increasing layer 8 is a plating layer, a thermally sprayed layer or a build-up welded layer, it is preferably formed with a larger thickness than required and then machined to a desired thickness. Because the deformation of the circular holding surfaces 11e, 11f of the outer cylinder 11 caused by the exchange of the inner cylinder 11 is usually about 10-100 μm, the diameter-increasing layers 8 are preferably as thick as about 50-1000 μm, sufficiently thicker than the deformation, taking repeated repairing operations into consideration. Incidentally, the deformation of the circular holding surfaces 11e, 11f means the deviation of the peripheral surface of the outer cylinder 11 from a perfect circle in the circular holding surfaces 11e, 11f, which is evaluated by deviations from a perfect circle measured at plural points in a longitudinal direction on the circular holding surfaces 11e, 11f.

(1) Plating Layer

The plating layer is preferably made of a hard metal, specifically a Cr plating layer or a Ni plating layer. From the aspect of corrosion resistance, heat resistance and hardness, the Cr plating layer is most preferable. The Cr plating layer may be a Cr layer, a Cr—Ni layer, etc. The composition of the Cr layer may comprise, for example, 0.2-0.5% by mass of oxygen and 0.03-1.0% by mass of hydrogen, the balance being Cr. Of course, part of Cr may be substituted by elements derived from a plating bath composition, additives or inevitable impurities. The Ni plating layer may be a Ni layer, a Ni—P layer, etc. Though the Ni plating layer can be formed by either electroless plating or electrolytic plating, the electrolytic plating is more preferable from the aspect of a coating speed.

If a Cr plating layer is formed before a new inner cylinder 12 is shrink-fit, the plating layer would likely be oxidized by heating for shrink fitting, and suffer fine cracking. In such a case, the plating layer is formed preferably after a new inner cylinder 12 is shrink-fit, for easy observation of surface conditions by the naked eye. Specifically, the Cr plating layer is formed preferably after the shrink fitting of a new inner cylinder 12, and the Ni plating layer may be formed before or after the shrink fitting of a new inner cylinder 12. Of course, as long as the plating layer with a designed size is firmly fixed by a holding member, cracks would not cause any problems.

(2) Thermally Sprayed Layer

Because the outer cylinder 11 per se is heated by thermal spraying, the thermally sprayed layer is formed preferably before a new inner cylinder 12 is shrink-fit. For example, chromium or its alloys can be used for thermal spraying, but the same material as that of the outer cylinder may be used. Thermal spraying methods include a wire flame thermal spraying method using a linear thermal spraying material, a rod flame thermal spraying method using a rod-shaped thermal spraying material, a powder flame thermal spraying method using thermal spraying material powder, an arc thermal spraying method using arc discharge between two metal wires, etc.

(3) Build-up Welded Layer

Because the outer cylinder 11 is heated in the case of build-up welding, too, the welded layer is formed preferably before a new inner cylinder 12 is shrink-fit. Though iron-based welding rods, etc. may be used for build-up welding, the same material as that of the outer cylinder may be used. A build-up welded metal is strongly adhered to the outer cylinder 11. Welding methods may be TIG welding or MIG welding.

(c) Outer cylinder and inner cylinder

Preferable for the outer cylinder 11 are high-strength, low-thermal-expansion metals having an average thermal expansion coefficient of $1\times10^{-6}/°$ C. to $5\times10^{-6}/°$ C. between 20° C. and 300° C., and $5\times10^{-6}/°$ C. or more between 20° C. and 600° C. One example of such high-strength, low-thermal-expansion metals is an Fe—Ni—Co alloy, to which one or more precipitation-strengthening elements such as Al, Ti, Nb, etc. are added. A preferable example of the compositions of such high-strength, low-thermal-expansion metals comprises 30-35% by mass of Ni, 12-17% by mass of Co, 0.5-1.5% by mass of Al, and 1.5-3% by mass of Ti, the balance being Fe. Al and Ti act as precipitation-strengthening elements.

Ceramics for the inner cylinder 12 are preferably silicon nitride-based sintered bodies such as silicon nitride, Sialon, etc. having excellent melting resistance, wear resistance, heat resistance, melt temperature retention and seizure resistance. The structure of the silicon nitride-based sintered body is constituted by particles of silicon nitride or Sialon and grain boundary phases containing rare earth elements. For example, silicon nitride has a thermal expansion coefficient of about $3\times10^{-6}/°$ C. between 20° C. and 600° C., as shown by A in FIG. 4.

Figure 4:
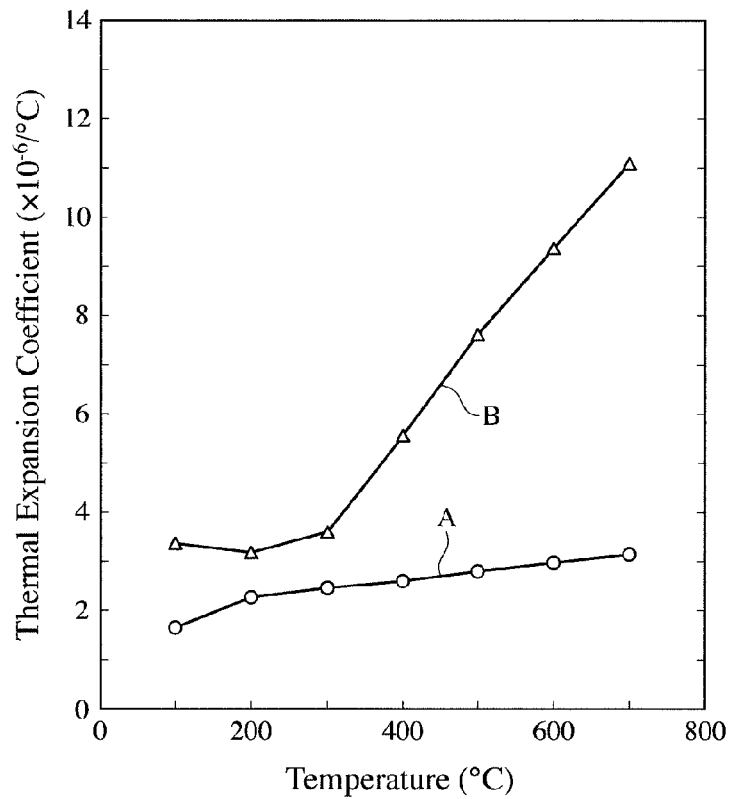
FIG. 4 is a graph showing the thermal expansion coefficients of silicon nitride and a high-strength, low-thermal-expansion metal between 100° C. and 700° C.

The thermal expansion coefficient of the high-strength, low-thermal-expansion metal having the above composition is shown by B in FIG. 4. Because there is a large thermal expansion coefficient difference between the outer cylinder 11 made of a high-strength, low-thermal-expansion metal and the inner cylinder 12 made of silicon nitride at a shrink fitting temperature of 550-600° C., the use of the high-strength, low-thermal-expansion metal in the outer cylinder 11 makes easy shrink fitting to the ceramic-made inner cylinder. When an aluminum melt is introduced into the die-casting sleeve 1, the outer cylinder 11 is usually heated up to about 300° C., but there is a small thermal expansion coefficient difference between the high-strength, low-thermal-expansion metal and silicon nitride in such a temperature range, resulting in no deviations in circumferential and radial directions between the outer cylinder 11 and the inner cylinder 12.

The high-strength, low-thermal-expansion metal preferably used for the outer cylinder 11 has tensile strength of 590 MPa or more, preferably 690 MPa or more, at a temperature of 20-500° C. This makes it possible to protect the ceramic-made inner cylinder 12 sufficiently from internal stress when a melt introduced into the sleeve 1 is injected. The outer cylinder 11 preferably has elongation of 15% or more (particularly 20% or more), thermal conductivity of 20 W/m·K or less, and Young's modulus of 130 GPa or more at room temperature.

The front ring member 2 shrink-fit to the tip end portion 11*a* of the outer cylinder 11 is preferably made of a metal having the same thermal expansion coefficient as that of the outer cylinder 11. In a case where heat resistance or wear resistance is important in the front ring member 2, the front ring member 2 preferably has heat resistance or wear resistance on the same level as that of the inner cylinder 12.

The outer cylinder 11 may be provided in an inner surface with pluralities of groove-shaped pores having such cross section shapes as semicircular, triangular or rectangular shapes. The pores may extend along the entire inner surface of the outer cylinder 11, or only in a highly heated portion thereof.

(B) Second Example

Figure 5:
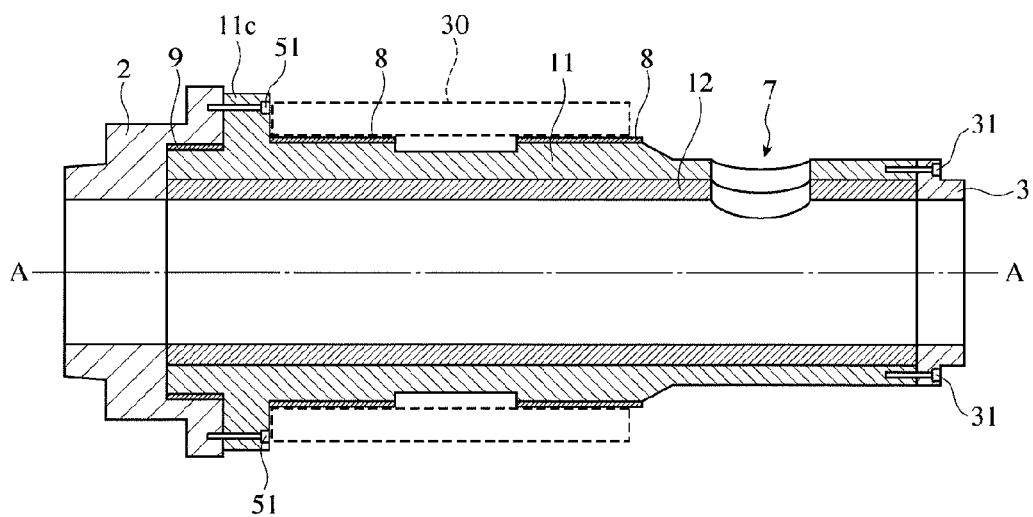
FIG. 5 is a cross-sectional view showing the second example of die-casting sleeves, on which the repairing method of the present invention can be used.

FIG. 5 shows the second example of die-casting sleeves, on which the repairing method of the present invention is used. In this sleeve 1, a diameter-increasing layer 9 is formed on the tip end portion 11*a* of the outer cylinder 11. The diameter-increasing layer 9 may be the same as the diameter-increasing layers 8, 8 formed on the circular holding surfaces 11*e*, 11*f*. The diameter-increasing layer 9 provides small deviation from a perfect circle in the tip end portion 11*a* of the outer cylinder 11, to which the front ring member 2 is shrink-fit.

(C) Third Example

Figure 6:
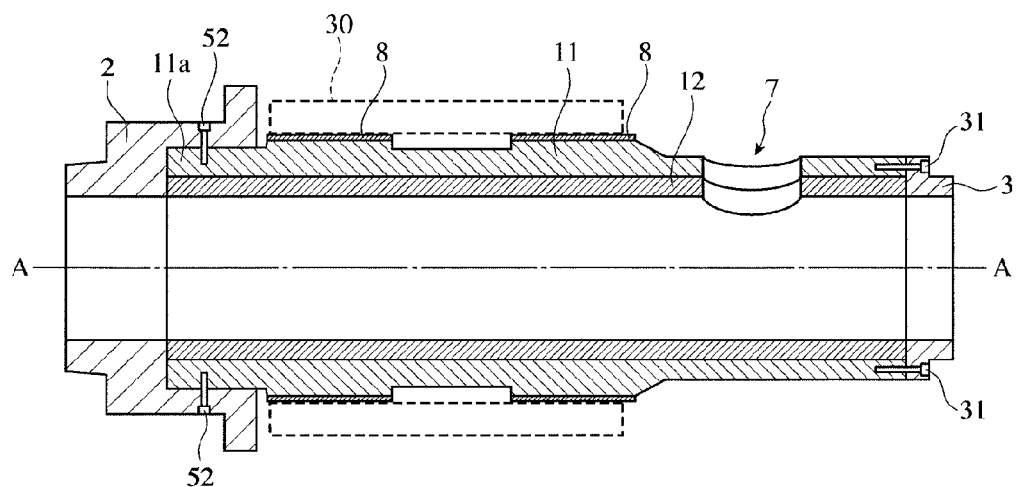
FIG. 6 is a cross-sectional view showing the third example of die-casting sleeves, on which the repairing method of the present invention can be used.

FIG. 6 shows the third example of die-casting sleeves, on which the repairing method of the present invention is used. In this sleeve 1, the front ring member 2 is fixed to the outer cylinder 11 with bolts 52.

(D) Fourth Example

Figure 7:
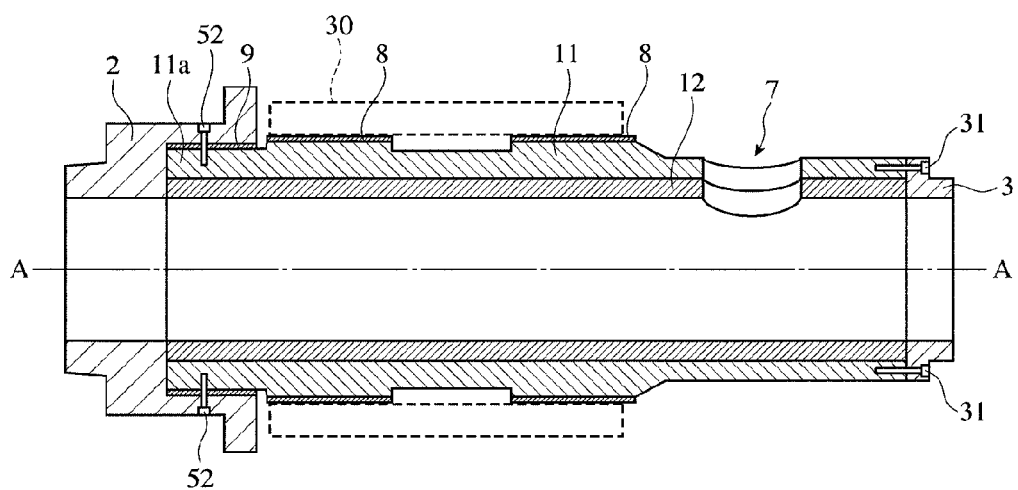
FIG. 7 is a cross-sectional view showing the fourth example of die-casting sleeves, on which the repairing method of the present invention can be used.

FIG. 7 shows the fourth example of die-casting sleeves, on which the repairing method of the present invention is used. In this sleeve 1, a diameter-increasing layer 9 is formed on the tip end portion 11*a* of the outer cylinder 11, and the front ring member 2 is fixed to the outer cylinder 11 with bolts 52. With this structure, the tip end portion 11*a* of the outer cylinder 11, to which the front ring member 2 is shrink-fit, has small deviation from a perfect circle.

(E) Fifth Example

Figure 8:
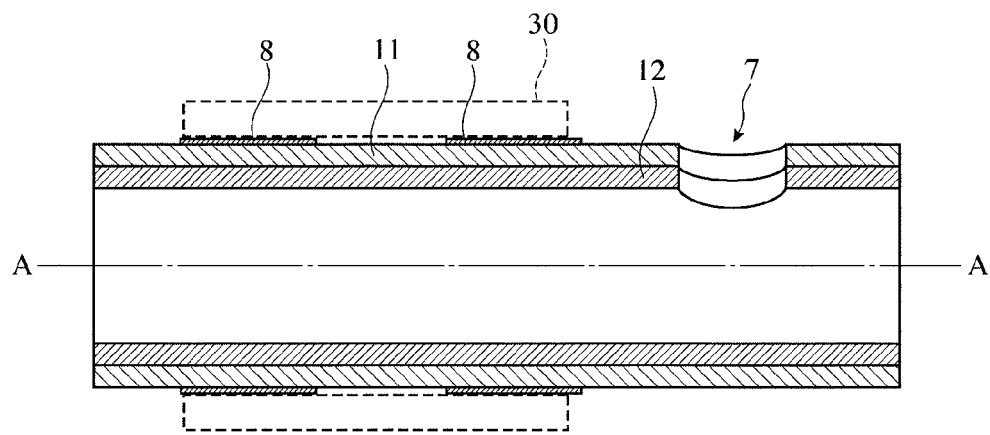
FIG. 8 is a cross-sectional view showing the fifth example of die-casting sleeves, on which the repairing method of the present invention can be used.

FIG. 8 shows the fifth example of die-casting sleeves, on which the repairing method of the present invention is used. In this sleeve 1, the peripheral surface of the outer cylinder 11 does not have two circular holding surfaces 11*e*, 11*f*, and diameter-increasing layers 8, 8 are directly formed on the peripheral surface of the outer cylinder 11. This structure can also provide a die-casting sleeve suitable for repairing.

(F) Sixth Example

Figure 9:
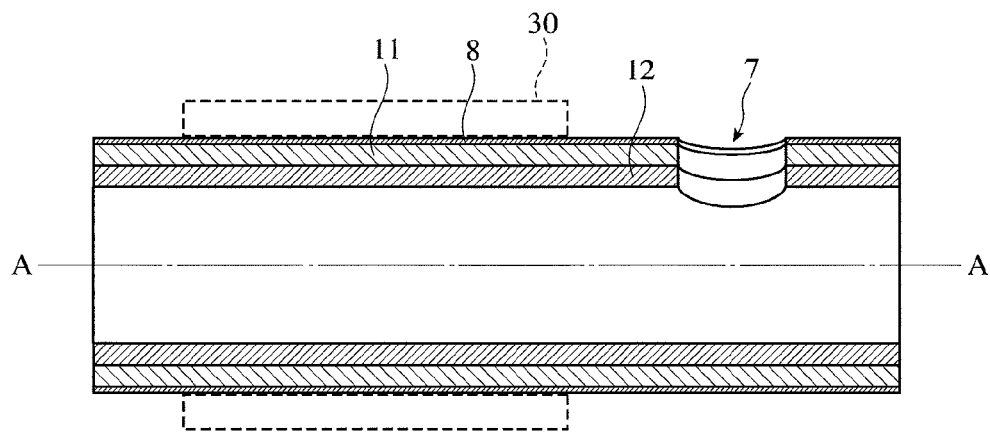
FIG. 9 is a cross-sectional view showing the sixth example of die-casting sleeves, on which the repairing method of the present invention can be used.

FIG. 9 shows the sixth example of die-casting sleeves, on which the repairing method of the present invention is used. In this sleeve 1, one diameter-increasing layer 8 is formed on the entire peripheral surface of the outer cylinder 11. Though two diameter-increasing layers 8, 8 provide gap-free fixing to the holding member more surely and easily, such fixing is not impossible with one diameter-increasing layer 8 formed on the entire surface.

[2] Repairing Method of Die-casting Sleeve

With respect to the first example of die-casting sleeves, the repairing method of the present invention will be explained in detail below without intention of restricting the present invention thereto, and other examples of die-casting sleeves can also be repaired similarly.

(A) Steps in First Repairing Method

Figure 10:
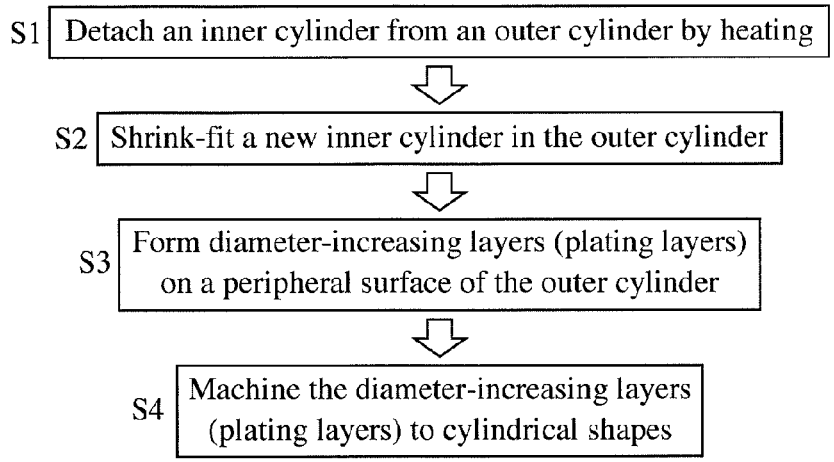
FIG. 10 is a flowchart showing the first step in the method of the present invention for repairing a die-casting sleeve.

FIG. 10 shows steps in the first method of the present invention for repairing a die-casting sleeve. The first repairing method is suitable in a case where a plating layer is used for the diameter-increasing layer 8, but it can of course be conducted even when a thermally sprayed layer or a build-up welded layer is used. Taking the plating layer for example, the first repairing method will be explained in detail below. First, a used inner cylinder 12, which should be exchanged, is detached by heating from an outer cylinder 11 of a sleeve 1 (step S1), and a new inner cylinder 12 is shrink-fit in the outer cylinder 11 (step S2). Plating layers 8 are formed on the peripheral surface (two circular holding surfaces 11*e*, 11*f*) of the outer cylinder 11 (step S3), and machined to cylindrical shapes (step S4). As described above, the diameter-increasing layer may be a thermally sprayed layer or a build-up welded layer in the steps in FIG. 10.

(B) Steps in Second Repairing Method

Figure 11:
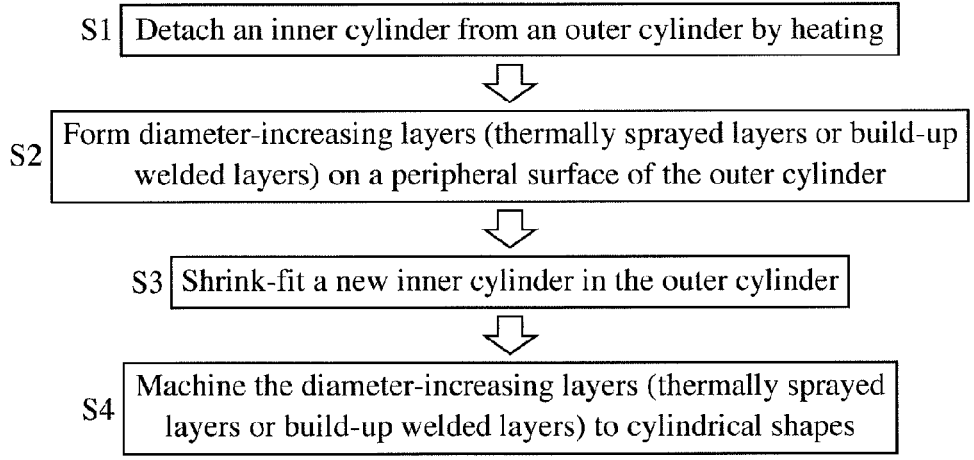
FIG. 11 is a flowchart showing the second step in the method of the present invention for repairing a die-casting sleeve.

FIG. 11 shows steps in the second method of the present invention for repairing a die-casting sleeve. The second repairing method is suitable when a thermally sprayed layer or a build-up welded layer is used for the diameter-increasing layer 8, but it may of course be conducted when a plating layer is used. Taking a thermally sprayed layer or a build-up welded layer for example, the second repairing method will be explained in detail below. First, a used inner cylinder 12, which should be exchanged, is detached by heating from the outer cylinder 11 of the sleeve 1 (step S1), and a thermally sprayed layer or a build-up welded layer 8 is formed on the peripheral surface (two circular holding surfaces 11*e*, 11*f*) of the outer cylinder 11 (step S2). A new inner cylinder 12 is shrink-fit in the outer cylinder 11 (step S3), and the thermally sprayed layer or build-up welded layer 8 on the outer cylinder 11 is machined to a cylindrical shape (step S4). Because the outer cylinder 11 is heated by thermal spraying or build-up welding, the thermally sprayed layer or build-up welded layer 8 is preferably formed before shrink-fitting a new inner cylinder 12. As described above, a plating layer may be used for the diameter-increasing layer in the steps in FIG. 11.

(C) All Steps of Repair

Figure 13:
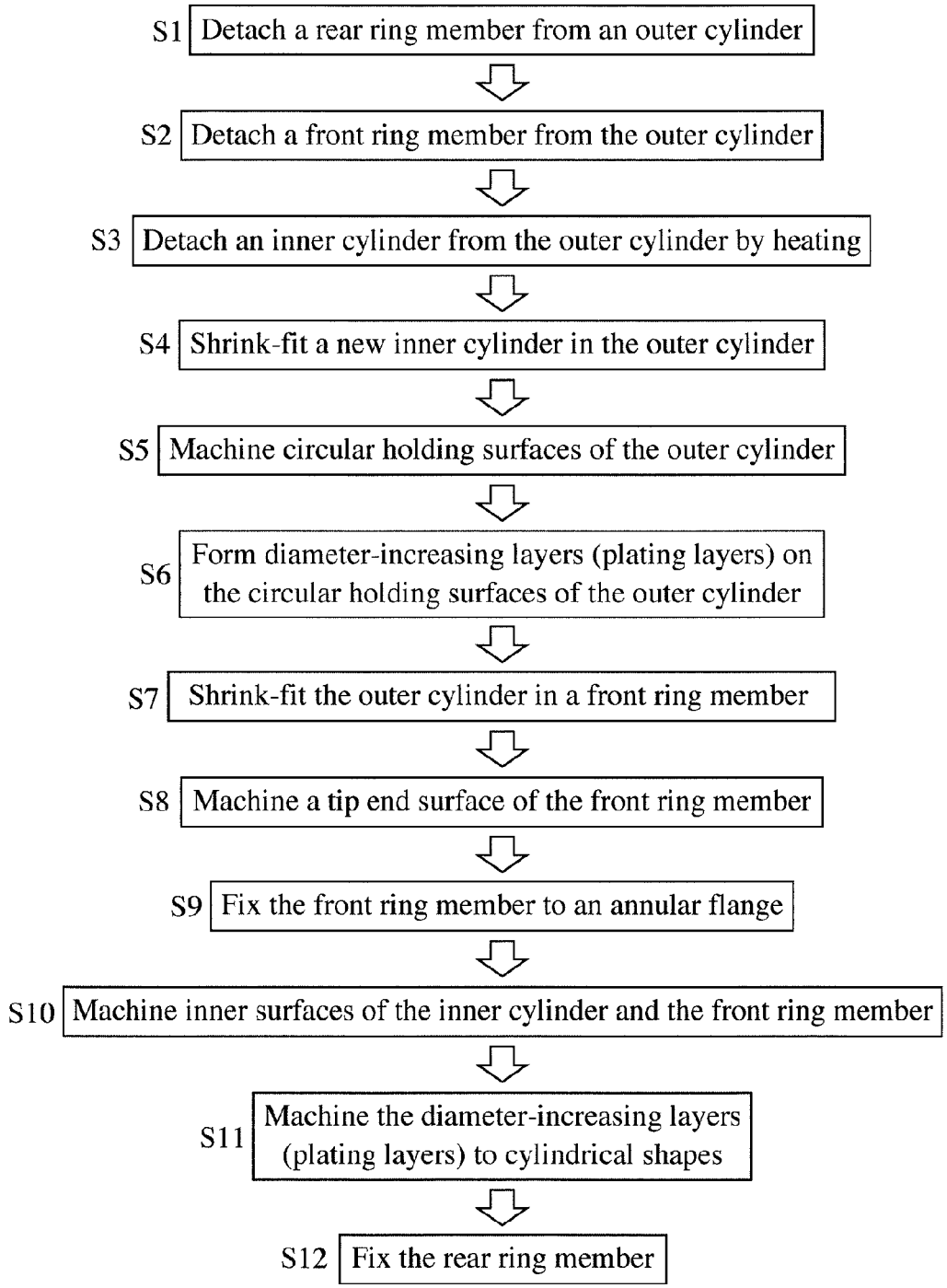
FIG. 13 is a flowchart showing the first example of all steps in the method of the present invention for repairing a die-casting sleeve.
Figure 14:
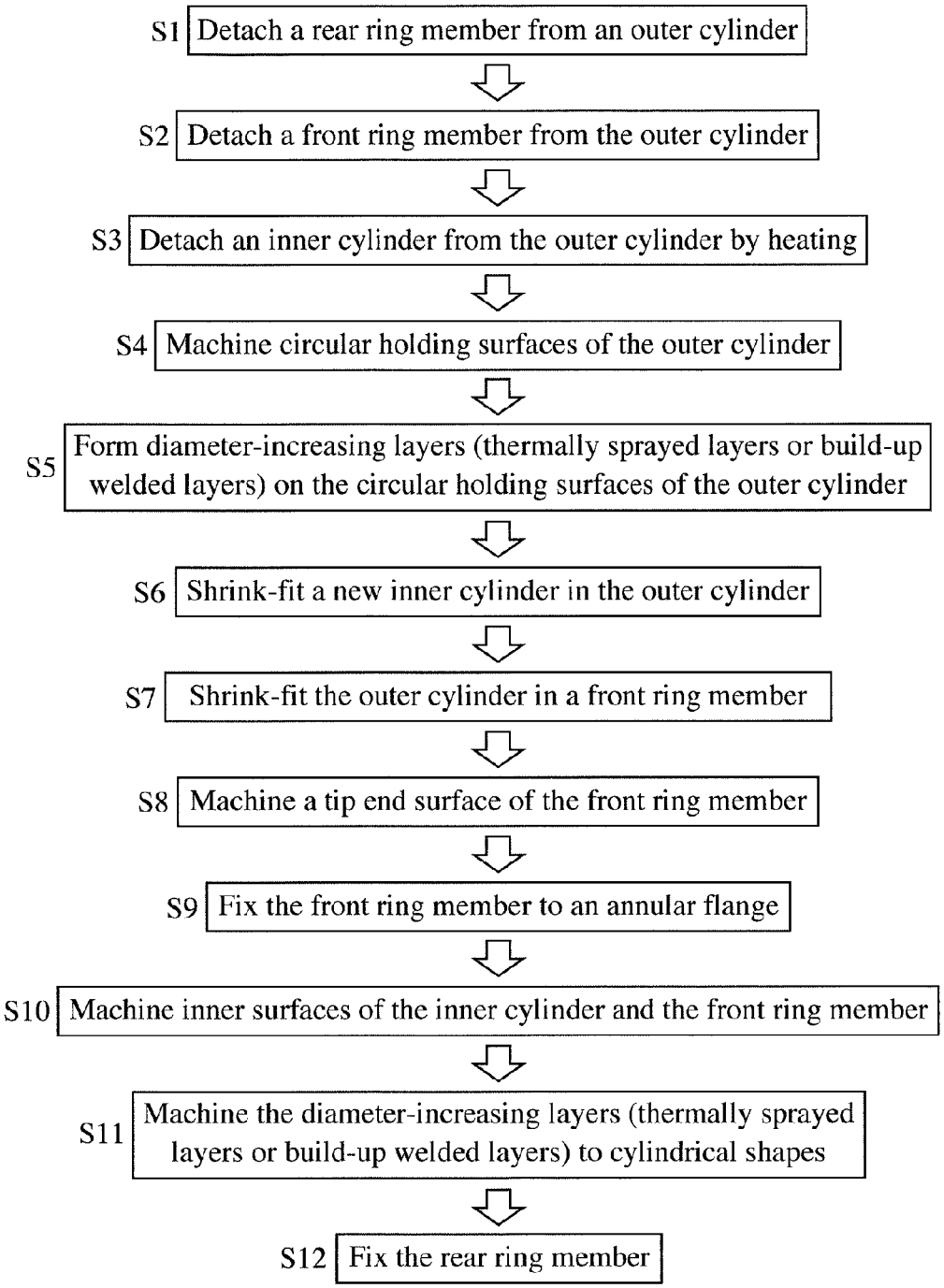
FIG. 14 is a flowchart showing the second example of all steps in the method of the present invention for repairing a die-casting sleeve.

The repairing method of the present invention includes the first method shown in FIG. 13 (a plating layer is used for the diameter-increasing layer 8 in the depicted example), and the second method shown in FIG. 14 (a thermally sprayed layer or build-up welded layer is used for the diameter-increasing layer 8 in the depicted example). In both methods, all steps of repair include steps not indispensable for the present invention, and the order of other steps than described above may be changed. Accordingly, all steps shown in FIGS. 13 and 14 are not necessarily indispensable, and their orders are not restrictive.

(1) Example of First Methods (a) First Repair

Figure 12:
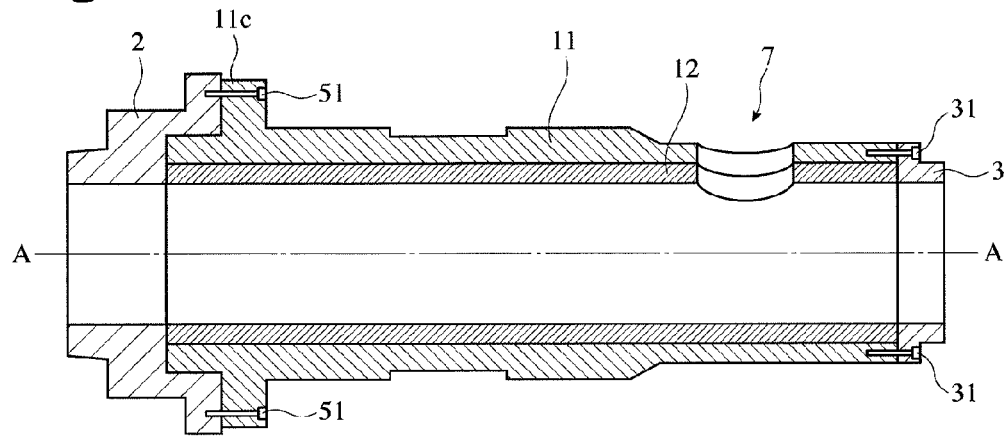
FIG. 12 is a cross-sectional view showing an unrepaired die-casting sleeve.

FIG. 12 shows a newly assembled sleeve 1, which is not repaired. In the unrepaired sleeve 1, a diameter-increasing layer 8 is not formed on the circular holding surfaces 11*e*, 11*f* of the outer cylinder 11. When the ceramic-made inner cylinder 11 is worn to a predetermined level, the rear ring member 3 is first detached from the outer cylinder 11 (step S1). Only the front ring member 2 is then heated to a temperature of 300-400° C., to remove the front ring member 2 from the outer cylinder 11 (step S2). After the sleeve 1 is further heated to a temperature of 550-700° C. to detach the inner cylinder 12 from the outer cylinder 11 (step S3), a new inner cylinder 12 is shrink-fit in the outer cylinder 11 at the same temperature (step S4). Detaching the used inner cylinder 12 by heating and shrink-fitting the new inner cylinder 12 may be conducted continuously, because they occur at the same temperature. Incidentally, when the sleeve 1 is placed in a heating apparatus utilizing radiant heat, the sleeve is heated from outside, making it possible to continuously detach the front ring member 2 and the inner cylinder 12 by heating. If necessary, machining for aligning the end surfaces of the inner cylinder 12 and the outer cylinder 11 is conducted.

Before plating layers 8 are formed, two circular holding surfaces 11e, 11f of the outer cylinder 11 are machined to cylindrical shapes (step S5). Because this makes smaller the deviation of the circular holding surfaces 11e, 11f from a perfect circle, the plating layers 8 can have the minimum necessary thickness. The plating layers 8 are then formed on each of two circular holding surfaces 11e, 11f machined to cylindrical shapes (step S6). Because the plating layers 8 are formed in a state where the assembled sleeve 1 is immersed in a plating bath, other portions than those to be plated should be masked. Masking can be made, for example, by a masking tape.

The plating layers 8 are preferably Cr plating layers or Ni plating layers. The Cr plating layers can be formed by (1) masking other portions than those for Cr plating with a plastic tape, an aluminum adhesive tape, etc., (2) degreasing the surface, (3) immersing the sleeve in a plating bath for etching to activate the surface, (4) conducting electrolytic Cr plating, and finally (5) washing and drying them. The Ni plating layers can be formed by an electroless Ni plating method or an electrolytic Ni plating method. In the electroless Ni plating method, Ni coatings are deposited by electrons discharged by the oxidation of a reducing agent contained in the plating bath, without supplying electric current. Other steps may be the same as in the Cr plating method.

The tip end portion 11a of the outer cylinder 11 is shrink-fit in a front ring member 2 (step S7). The front ring member 2 may be either a used one detached by heating or a new one. In any case, a tip end surface of the shrink-fit front ring member 2 is machined to a predetermined size such that the front ring member 2 is adapted to a die-casting machine (step S8).

The front ring member 2 is fixed to an annular flange 11c of the outer cylinder 11 with bolts 51, 51 (step S9), to prevent deviation when the front ring member 2 is heated by a melt supplied to the sleeve 1.

The inner surfaces of the inner cylinder 12 and the front ring member 2 shrink-fit to the outer cylinder 11 are ground to become even (step S10). This makes it possible for a plunger tip to slide smoothly in the sleeve 1.

The peripheral surface of the outer cylinder 11, in which a new inner cylinder 12 has been shrink-fit, is slightly deformed, resulting in larger deviation of the circular holding surfaces 11e, 11f from a perfect circle. Unless the circular holding surfaces 11e, 11f were in a sufficiently perfect circle, firm fixing to the holding members of the die-casting machine would not be achieved, resulting in vibrations during operation. Accordingly, the plating layers 8 formed on the circular holding surfaces 11e, 11f of the outer cylinder 11, in which the new inner cylinder 12 has been shrink-fit, are machined to cylindrical shapes (step S11). Machining may be, for example, cutting, grinding or polishing. Even when grinding is used in examples below, it is of course not restrictive, but cutting or polishing may be used. The plating layers 8 formed and machined by the method of the present invention have outer diameters, which would be reduced only slightly if any by one repairing operation, so that repair can be repeated extremely many times until the outer cylinder 11 becomes to have an unfitted size to the holding members of the die-casting machine.

Finally, the rear ring member 3 is fixed to the rear end surface 11b of the outer cylinder 11 with bolts 31 (step S12).

(b) Repair After Second One

In a case where the repaired sleeve 1 is repaired again, the outer cylinder 11 is already provided with diameter-increasing layers (plating layers) 8 on two circular holding surfaces 11e, 11f. If plating layers were formed on the existing plating layers 8, sufficient adhesion would not be obtained. Thus, the steps S5 and S6 are changed to remove the used plating layers 8, grinding each circular holding surface 11e, 11f as a base to a cylindrical shape, and then form a new plating layer 8 on each of two circular holding surfaces 11e, 11f, which is exposed in a cylindrical shape. Other steps may be the same as in the first repair.

(2) Example of Second Methods (a) First Repair

Because the outer cylinder 11 is heated by thermal spraying or build-up welding as described above, as shown in the flowchart of FIG. 14, after the formation of diameter-increasing layers 8 (step S5), a new inner cylinder 12 is shrink-fit in the outer cylinder 11 (step S6). In the case of thermal spraying, other portions than those subject to thermal spraying should be masked. In the case of build-up welding, masking is not necessary, but may be made in other portions than those subject to build-up welding. Masking may be made, for example, by a masking tape. Because a thicker build-up welded layer can be formed faster than the plating layer, the circular holding surfaces 11e, 11f may not be ground to cylindrical shapes in advance (the step S4 may be omitted). With respect to other steps, it may be the same as the first example.

(b) Repair After Second One

Because new thermally sprayed layers or build-up welded layers are well adhered to the used thermally sprayed layers or build-up welded layers unlike the plating layers, the used thermally sprayed layers or build-up welded layers need not be removed completely, when two circular holding surfaces 11e, 11f of the outer cylinder 11 are ground in the step S4. With respect to other steps, it may be the same as the first example.

(3) Third Method Example

In repair after second one, plating layers and thermally sprayed layers or build-up welded layers may be combined as the diameter-increasing layers 8. Specifically, (a) when the plating layers are formed on the outer cylinder 11 of the sleeve 1 to be repaired, after removing the plating layers, plating layers may be formed again, or thermally sprayed layers or build-up welded layers may be formed, and (b) when the thermally sprayed layers or the build-up welded layers are formed on the outer cylinder 11 of the sleeve 1 to be repaired, thermally sprayed layers or build-up welded layers may be formed again, or plating layers may be formed, after grinding the circular holding surfaces 11e, 11f. A combination of the plating layers and the thermally sprayed layers or the build-up welded layers enables increased numbers of repair, because the circular holding surfaces 11e, 11f becoming low in height by grinding can be made higher by thermal spraying or build-up welding.

(4) Modified Examples

In any case where the diameter-increasing layer 8 is a plating layer, a thermally sprayed layer or a build-up welded layer, steps are changed depending on modifications made on die-casting sleeves in the second to sixth examples shown in FIGS. 5-9.

(a) Die-casting Sleeve in Second Example (FIG. 5)

Because it has a diameter-increasing layer 9 on the tip end portion 11a of the outer cylinder 11, the diameter-increasing layer 9 may be formed simultaneously with forming the diameter-increasing layers 8 on the circular holding surfaces 11e, 11f.

(b) Die-casting Sleeve in Third Example (FIG. 6)

The step of fixing the front ring member 2 to the annular flange 11c with bolts 51, 51 need only be changed to a step of fixing the front ring member 2 to the outer cylinder 11 with bolts 52.

(c) Die-casting Sleeve in Fourth Example (FIG. 7)

What is needed is to form a diameter-increasing layer 9 on the tip end portion 11a of the outer cylinder 11, and fix the front ring member 2 to the outer cylinder 11 with bolts 52.

(d) Die-casting Sleeve in Fifth Example (FIG. 8)

Because two diameter-increasing layers 8 are formed on a smooth peripheral surface of the outer cylinder 11, the outer cylinder 11 is free from an annular flange 11c.

(e) Die-casting Sleeve in Sixth Example (FIG. 9)

One diameter-increasing layer 8 need only be formed on an entire peripheral surface of the outer cylinder 11 free from an annular flange 11c.

The present invention will be explained in more detail with Examples below, without intention of restricting the present invention thereto.

EXAMPLE 1

A sleeve 1 having the structure shown in FIG. 1, which comprised an outer cylinder 11 (outer diameter: 130 mm, inner diameter: 90 mm, and length: 400 mm, with no diameter-increasing layer) made of a high-strength, low-thermal-expansion metal, an inner cylinder 12 (outer diameter: 90 mm, inner diameter: 60 mm, and length: 400 mm) made of Sialon, and a front ring member 2 and a rear ring member 3 both made of hot-working tool steel, was assembled in an injection apparatus in a horizontal die-casting machine with a clamping power of 350 tons, and used for the die-casting of an aluminum alloy until the inner cylinder 12 was worn to a level needing exchange. The high-strength, low-thermal-expansion metal had an average thermal expansion coefficient of $3.6 \times 10^{-6}/°$ C. between 20° C. and 300° C. and $9.5 \times 10^{-6}/°$ C. between 20° C. and 600° C., and tensile strength of 735-1205 MPa at a temperature of 20-500° C., and was obtained by sintering metal powder comprising 32.6% by mass of Ni, 14.9% by mass of Co, 0.8% by mass of Al, and 2.3% by mass of Ti, the balance being Fe and inevitable impurities. Sialon was obtained by sintering a material powder having a composition comprising 87% by mass of $Si_3N_4$, 6% by mass of $Y_2O_3$, 4% by mass of $Al_2O_3$, and 3% by mass of AlN. The outer cylinder 11 had Young's modulus of 150 GPa between room temperature and 300° C.

To repair the sleeve 1 with a worn inner cylinder 12, the rear ring member 3 was detached from the outer cylinder 11 (step S1), and only the front ring member 2 was then heated to a temperature of 400° C. so that the front ring member 2 was detached from the outer cylinder 11 (step S2), according to the flowchart shown in FIG. 13. Further, the sleeve 1 was heated to a temperature of 700° C. to detach the inner cylinder 12 from the outer cylinder 11 (step S3), and a new inner cylinder 12 was immediately shrink-fit in the outer cylinder 11 at the same temperature (step S4). Both end surfaces of the inner cylinder 12 were ground so that they were aligned with the end surfaces of the outer cylinder.

Two circular holding surfaces 11e, 11f of the outer cylinder 11, in which the new inner cylinder 12 was shrink-fit, were ground to cylindrical shapes (step S5). The outer cylinder was regulated to have such a cylindrical shape that deviations from a perfect circle measured at plural points in a longitudinal direction were 10 μm. With other portions than two circular holding surfaces 11e, 11f masked, 60-μm-thick Cr plating layers 8 were formed on the cylindrically ground surfaces, using a Sargent bath at 60° C., at a current density of 60 A/dm² (step S6). The resultant Cr plating layer 8 had a composition comprising 0.4% by mass of oxygen, and 0.05% by mass of hydrogen, the balance being Cr.

The front ring member 2 was then heated to a temperature of 400° C., and shrink-fit to the tip end portion 11a of the outer cylinder 11 (step S7). With a tip end surface of the shrink-fit front ring member 2 machined to a predetermined size (step S8), the front ring member 2 was threadably fixed to an annular flange 11c (step S9).

The inner surfaces of the inner cylinder 12 and the front ring member 2 shrink-fit to the outer cylinder 11 were ground to constitute an even inner surface (step S10). Because the peripheral surface of the outer cylinder 11 in which the new inner cylinder 12 was shrink-fit was slightly deformed, the plating layers 8 were ground by about 10 μm on average to have circular peripheries (step S11). The deviations of the plating layers from a perfect circle were 10 μm when measured at plural points in a longitudinal direction. Finally, the rear ring member 3 was fixed to the rear end surface 11b of the outer cylinder 11 with bolts 31 (step S12).

The repaired sleeve 1 was assembled in the injection apparatus in the horizontal die-casting machine with a clamping power of 350 tons, and used for the die-casting of large aluminum alloy products requiring high dimensional accuracy. As a result of die-casting an aluminum alloy with a casting cycle time of 2 minutes, 100,000 shots or more of stable injection were able to be conducted, without observing any decrease in the shrink-fitting effects between the outer cylinder 11 and the inner cylinder 12. Neither melting, wearing, seizure, cracking, etc. in the inner surface of the inner cylinder 12, nor temperature decrease of a melt in the sleeve 1 and the wearing of the plunger tip occurred.

EXAMPLE 2

After the sleeve 1 repaired in Example 1 was used for die-casting an aluminum alloy until the inner cylinder 12 was worn to a level needing exchange, it was repaired again. In the second repair, the circular holding surfaces 11e, 11f were removed slightly after the plating layers 8 were removed, by grinding two circular holding surfaces 11e, 11f of the outer cylinder 11, in which the new inner cylinder 12 was shrink-fit, to cylindrical shapes (step S5). 110-μm-thick plating layers 8 were newly formed on the exposed circular holding surfaces 11e, 11f in the step S6. The plating layers 8 were ground to cylindrical shapes by an average depth of about 10 μm. The twice-repaired sleeve 1 was assembled in the injection apparatus in the horizontal die-casting machine with a clamping power of 350 tons, and used for the die-casting of large aluminum alloy products requiring high dimensional accuracy. The same results as in Example 1 were obtained.

EXAMPLE 3

The same sleeve 1 as in Example 1, in which the inner cylinder 12 was worn, was repaired by the same method as in Example 1, except for forming pure-Ni plating layers having a thickness of 60 μm in place of the Cr plating layers as the diameter-increasing layers 8. The Ni plating layers were formed using a nickel sulfamate bath at 50° C., at a current density of 30 A/dm². The repaired sleeve 1 was assembled in the injection apparatus in the horizontal die-casting machine with a clamping power of 350 tons, and used for the die-casting of large aluminum alloy products requiring high dimensional accuracy. The same results as in Example 1 were obtained.

EXAMPLE 4

After the sleeve 1 repaired in Example 3 was used for die-casting an aluminum alloy until the inner cylinder 12 was worn to a level needing exchange, it was repaired again. In the second repair, the Ni plating layers 8 were also removed, when two circular holding surfaces 11e, 11f of the outer cylinder 11, in which the new inner cylinder 12 was shrink-fit, were ground to cylindrical shapes (step S5). An average grinding depth was about 100 μm. Ni plating layers 8 newly formed on the exposed circular holding surfaces 11e, 11f were as thick as 110 μm. Other steps were the same as in Example 3. The twice-repaired sleeve 1 was assembled in the injection apparatus in the horizontal die-casting machine with a clamping power of 350 tons, and used for the die-casting of large aluminum alloy products requiring high dimensional accuracy. The same results as in Example 1 were obtained.

EXAMPLE 5

The same sleeve 1 as in Example 1, in which the inner cylinder 12 was worn, was repaired according to the flowchart shown in FIG. 14, using thermally sprayed layers for the diameter-increasing layers 8. Thermally sprayed layers formed by a powder flame thermal spraying method on two circular holding surfaces 11e, 11f in the step S5 were as thick as 200 μm with a composition of Cr—Ni. After the formation of the thermally sprayed layers 8, a new inner cylinder 12 was shrink-fit in the outer cylinder 11 (step S6). Other steps were the same as in Example 1. To make the thermally sprayed layers 8 have cylindrical shapes, an average grinding depth was about 100 μm. The repaired sleeve 1 was assembled in the injection apparatus in the horizontal die-casting machine with a clamping power of 350 tons, and used for the die-casting of large aluminum alloy products requiring high dimensional accuracy. The same results as in Example 1 were obtained.

EXAMPLE 6

The sleeve 1 repaired in Example 5 was used to die-cast an aluminum alloy until the inner cylinder 12 was worn to a level needing exchange, and then repaired again. In the second repair, the thermally sprayed layers 8 were also removed, when two circular holding surfaces 11e, 11f of the outer cylinder 11, in which the new inner cylinder 12 was shrink-fit, were ground to cylindrical shapes (step S5). Thermal spray layers 8 newly formed on the exposed circular holding surfaces 11e, 11f were as thick as 250 μm. To make the thermally sprayed layers 8 have cylindrical shapes, an average grinding depth was about 150 μm. Other steps were the same as in Example 5. The twice-repaired sleeve 1 was assembled in the injection apparatus in the horizontal die-casting machine with a clamping power of 350 tons, and used for the die-casting of large aluminum alloy products requiring high dimensional accuracy. The same results as in Example 1 were obtained.

EXAMPLE 7

The same sleeve 1 as in Example 1, in which inner cylinder 12 was worn, was repaired using build-up welded layers as the diameter-increasing layers 8, according to the flowchart shown in FIG. 14. In the step S5, 1-mm-thick, build-up welded layers were formed on two ground circular holding surfaces 11e, 11f, using an iron-based welding rod. After the formation of the build-up welded layers 8, a new inner cylinder 12 was shrink-fit in the outer cylinder 11 (step S6). The build-up welded layers 8 formed on the exposed circular holding surfaces 11e, 11f were as thick as 1 mm on average. To make the thermally sprayed layers 8 have cylindrical shapes, an average grinding depth was about 500 μm. Other steps were the same as in Example 1. The repaired sleeve 1 was assembled in the injection apparatus in the horizontal die-casting machine with a clamping power of 350 tons, and used for the die-casting of large aluminum alloy products requiring high dimensional accuracy. The same results as in Example 1 were obtained.

EXAMPLE 8

The sleeve 1 repaired in Example 7 was used to die-cast an aluminum alloy until the inner cylinder 12 was worn to a level needing exchange, and repaired again. In the second repair, the build-up welded layers 8 were also removed, when two circular holding surfaces 11e, 11f of the outer cylinder 11, in which the new inner cylinder 12 was shrink-fit, were ground to cylindrical shapes (step S5). Build-up welded layers 8 newly formed on the exposed circular holding surfaces 11e, 11f were as thick as 1 mm on average. To make the thermally sprayed layers 8 have cylindrical shapes, an average grinding depth was about 800 μm. Other steps were the same as in Example 7. The twice-repaired sleeve 1 was assembled in the injection apparatus in the horizontal die-casting machine with a clamping power of 350 tons, and used for the die-casting of large aluminum alloy products requiring high dimensional accuracy. The same results as in Example 1 were obtained.

EFFECTS OF THE INVENTION

In the repair of a die-casting sleeve comprising a ceramic-made inner cylinder shrink-fit in a metal-made outer cylinder, a peripheral surface of the outer cylinder can be returned to a cylindrical shape substantially without reducing its outer diameter, by detaching the used inner cylinder from the outer cylinder by heating, forming a diameter-increasing layer on the peripheral surface of the outer cylinder before or after shrink-fitting a new inner cylinder in the outer cylinder, assembling the new inner cylinder in the outer cylinder, and then machining the diameter-increasing layer to a cylindrical shape. Because the diameter-increasing layer is formed and machined to a cylindrical shape, the outer cylinder suffers only extremely small reduction of its outer diameter, if any, by one repairing operation, making it possible to repeat repairs until the outer cylinder becomes inadaptable in size to a holding member of a die-casting machine. The repeatedly usable outer cylinder has a long life, preferable from the aspect of reducing cost and protecting resources and environment. A sleeve repeatedly repaired by the method of the present invention having such features is free from vibration when assembled in a die-casting machine.

What is claimed is:

1. A method for repairing a die-casting sleeve comprising a ceramic-made inner cylinder shrink-fit in a metal-made outer cylinder, comprising the steps of detaching the used inner cylinder from said outer cylinder by heating; forming a diameter-increasing layer on a peripheral surface of said outer cylinder, before or after shrink-fitting a new inner cylinder in said outer cylinder; assembling said new inner cylinder in said outer cylinder; and then machining said diameter-increasing layer to a cylindrical shape.

2. The method for repairing a die-casting sleeve according to claim 1, wherein said diameter-increasing layer is a plating layer, a thermally sprayed layer or a build-up welded layer.

3. The method for repairing a die-casting sleeve according to claim 2, wherein said diameter-increasing layer is a plating layer of a hard metal.

4. The method for repairing a die-casting sleeve according to claim 3, wherein said plating layer is a Cr plating layer or a Ni plating layer.

5. The method for repairing a die-casting sleeve according to claim 4, wherein when a Cr plating layer remains on a peripheral surface of the detached outer cylinder, a new Cr plating layer is formed after removing the remaining Cr plating layer.

6. The method for repairing a die-casting sleeve according to claim 3, wherein when said diameter-increasing layer is a plating layer of a hard metal, said plating layer is formed on a peripheral surface of said outer cylinder after the new inner cylinder is shrink-fit.

7. The method for repairing a die-casting sleeve according to claim 2, wherein when said diameter-increasing layer is a thermally sprayed layer or a build-up welded layer, said thermally sprayed layer or said build-up welded layer is formed on a peripheral surface of said outer cylinder before the new inner cylinder is shrink-fit.

8. The method for repairing a die-casting sleeve according to claim 1, wherein in the case in which a repaired die-casting sleeve is repaired again, a new diameter-increasing layer is formed after the used diameter-increasing layer is removed.

9. The method for repairing a die-casting sleeve according to claim 1, wherein the metal forming said outer cylinder is a metal having an average thermal expansion coefficient of $1 \times 10^{-6}/°$ C. to $5 \times 10^{-6}/°$ C. between 20° C. and 300° C., and $5 \times 10^{-6}/°$ C. or more between 20° C. and 600° C.

10. The method for repairing a die-casting sleeve according to claim 9, wherein said metal has tensile strength of 590 MPa or more at a temperature of 20-500° C.

11. The method for repairing a die-casting sleeve according to claim 1, wherein the metal forming said outer cylinder is an Fe—Ni—Co alloy, to which one or more precipitation-strengthening elements are added.

12. The method for repairing a die-casting sleeve according to claim 1, wherein the ceramic forming said inner cylinder is a silicon nitride-based sintered body.

* * * * *